Patented Oct. 31, 1939

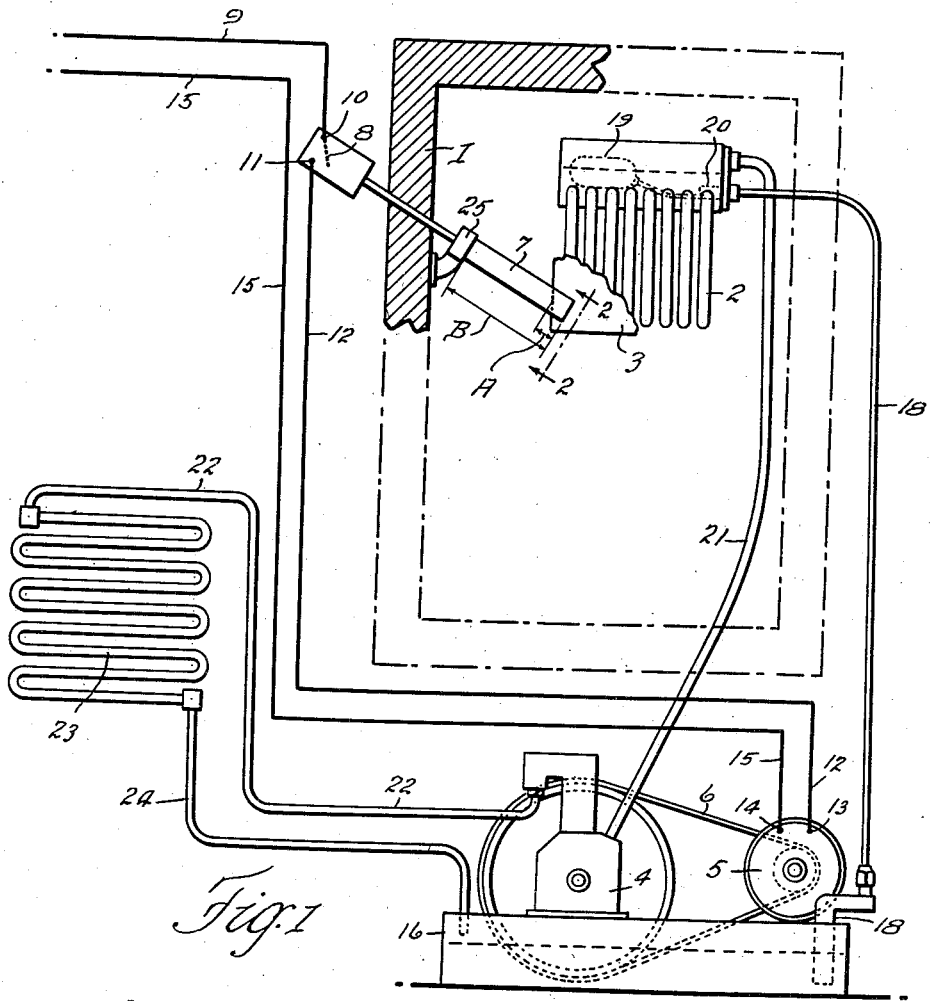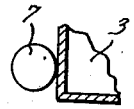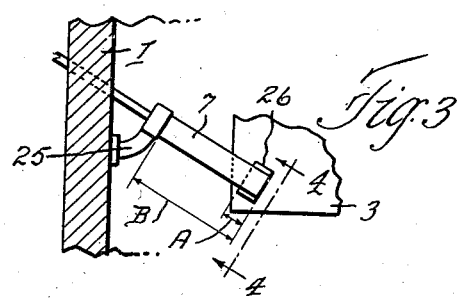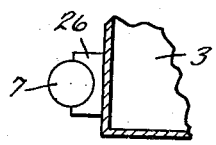

2,178,200

UNITED STATES PATENT OFFICE 2,178,200

REFRIGERATING SYSTEM AND CONTROL THEREFOR

John W. Cannon, Pennington, N. J.

Application November 5, 1937, Serial No. 172,950

3 Claims. (Cl. 62—4)

This invention relates generally to a refrigerating apparatus and more particularly to a single control therefor which will regulate during normal performance and will prevent excessive accumulation of ice or frost upon the evaporator.

In refrigerating systems of the compressor-evaporator-expansion type, units have been provided having defrosting thermostats for automatically defrosting the evaporators. One of such defrosting thermostats is disclosed in my prior Patent No. 2,049,413 issued August 4, 1936, wherein the defrosting thermostat is operable to render the normal control means ineffective when a predetermined amount of ice or frost has accumulated on the evaporator.

The main object of this invention is to provide a refrigerating system with a single thermostat which will function to control the temperature of the cooling compartment in the usual manner until a part thereof has become coated with a layer of ice spreading thereover from the evaporator, and will thereupon automatically function to discontinue the operation of the evaporator until the layer of ice has melted, whereupon it will again function as the normal control.

I accomplish this result by arranging the thermostat adjacent to the bottom of the evaporator and in such a position that a certain portion thereof is disposed in heat conducting relation to the evaporator and a certain portion thereof is disposed in the path of the thermo-siphonically circulating air. In the preferred embodiment of my invention, I make use of a thermostat which preferably consists of a cylindrical bulb about three inches long and having an outside diameter of about ⅝ of an inch. The bulb of the thermostat is preferably positioned so that it has a line contact with the evaporator for about one-half inch. The remaining portion of the bulb, or about 2½ inches thereof, is disposed so that it will be wiped effectively by the thermo-siphonically circulating air in the cooling chamber. The thermostat is preferably set to cut in or make the circuit at about 33° F. and to cut out or break the circuit at about 28° F. When the thermostat is positioned as described, the thermally circulating air passing over the exposed portion thereof permits it to act as a normal control and to regulate the temperature of the cooling chamber. However, when a layer of ice spreads from the evaporator onto that portion of the thermostat which is adjacent to the evaporator, it serves to conduct the lower temperature in the evaporator to the thermostat. Then the temperature of the thermostat as a whole is reduced rapidly by the low temperature of the portion which is in contact with the evaporator, whereupon the thermostat operates to break the circuit and to stop the compressor, which remains inactive until the layer of ice has substantially melted, whereupon the thermostat will again function as a normal control.

Further and more limited objects of the invention will appear as the description proceeds in connection with the accompanying drawing, in which Fig. 1 is a somewhat diagrammatic view of a refrigerating system embodying my invention; Fig. 2 is a fragmentary sectional view on the line 2—2 of Fig. 1; Fig. 3 is a fragmentary view illustrating a modified form of my invention, and Fig. 4 is a fragmentary sectional view on the line 4—4 of Fig. 3.

In the drawing, I have disclosed a refrigerating system which includes a cooling chamber 1 in which is disposed an evaporator 2 (or a brine tank if desired) which has flat surfaces thereon indicated by the reference character 3. The reference character 4 designates a compressor which is operated by an electric motor 5 through the medium of a belt 6. Disposed in contact with the surface 3 is a thermostat 7 which serves both as a normal control thermostat and as a defrosting thermostat. This thermostat consists of a tube about three inches minimum length of a tube about three inches minimum length and having an outside diameter of about ⅝ inch. As shown in Figs. 1 and 2, the inner end of the tube has a line contact with the surface 3 of the evaporator or brine tank for a distance of about ½ inch. The outer end of the tube projects outwardly for a distance of approximately 2½ inches, and is so positioned as to be wiped effectively by the thermo-siphonically circulating air in the cooling chamber. The time required to freeze the solution in the bulb, or to reduce the temperature of the gas in the bulb to the cut-out point, is governed by the temperature of the evaporator or brine tank and the temperature of the air circulating over the exposed portion of the bulb. The thermostat of course actuates the switch 8 to make and break the circuit to the motor which operates the compressor.

Leading from one side of the line is a wire 9 which connects with a terminal 10 of the switch 8, and leading from the opposite terminal 11 of the switch is a wire 12 which connects with one terminal 13 of the electric motor 5 which operates the compressor. Leading from the opposite terminal 14 of the motor is a wire 15 which connects with the opposite side of the line.

The compressor and the motor are supported upon the base member, which is constructed to provide a receiver tank 16. Leading from the receiver tank 16 is a pipe 18 which communicates with the evaporator 2. Arranged within the float chamber of the evaporator is a float 19 which operates a valve 20 and serves to maintain a constant level of refrigerant in the evaporator. The liquid refrigerant, preferably $SO_2$, is admitted from the float chamber into the chilling unit of the evaporator where it evaporates, absorbing heat from the interior of the cooling chamber 1. Leading from the evaporator is a pipe 21 which communicates with the compressor 4, and leading from the compressor is a pipe 22 which communicates with the receiver 23, from which a return pipe 24 communicates with the receiver tank 16.

The outer end of the thermostat may be supported by a bracket 25 secured to the wall of the cooling chamber.

In Fig. 3 there is disclosed a slightly modified form of my invention in which the thermostat 7 is supported by a bracket 25ª secured to the wall of the cooling chamber and insulated from the evaporator by a block 26 of approximately the shape and size shown, spacing the thermostat approximately ⅛ inch from the evaporator, and which is preferably formed of porcelain or glass or other suitable material having substantially the same heat conductivity as ice. In other respects, this form of the invention is similar to and operates generally in the same manner as that disclosed in Figs. 1 and 2.

My invention is also applicable to refrigerating systems of the gas fired or generator-condenser type, wherein the thermostat will operate a valve for controlling the rate of evaporation of refrigerant.

It will now be clear that I have provided a control for refrigerating systems which will accomplish the objects of the invention as hereinbefore stated. It is of course to be understood that the embodiments of the invention herein disclosed are to be considered merely as illustrative and not in a limiting sense as various changes may be made in details of arrangement without departing from the spirit of my invention.

Having thus described my invention, what I claim is:

1. The combination with a refrigerator cabinet including a cooling chamber, of a refrigerant circuit including an evaporator for cooling said chamber, and a single thermostat for controlling the rate of evaporation of refrigerant and for defrosting the evaporator, and means supporting said thermostat in such fixed relation with respect to the lower portion of said evaporator that a portion at one end of the thermostat may be affected by the building up of ice on said portion of the evaporator and initiate a defrosting cycle, while the rest of the thermostat projects freely away from the evaporator into the path of air circulating through the cooling chamber, said projecting portion being of such extent as to cause the thermostat to respond to temperature changes in said chamber and to exert normal control of the refrigerant circuit.

2. An arrangement of the type set forth in claim 1 wherein the portion of the thermostat which may be affected by the building up of ice on the lower portion of the evaporator is in line contact with said evaporator.

3. An arrangement of the type set forth in claim 1 wherein the portion of the thermostat which may be affected by the building up of ice on the lower portion of the evaporator is spaced from the said portion by a material having substantially the same heat conductivity as ice.

JOHN W. CANNON.